No. 741,203. PATENTED OCT. 13, 1903.
W. A. WILLIAMS.
FLUSHING TANK.
APPLICATION FILED FEB. 14, 1903.
NO MODEL.
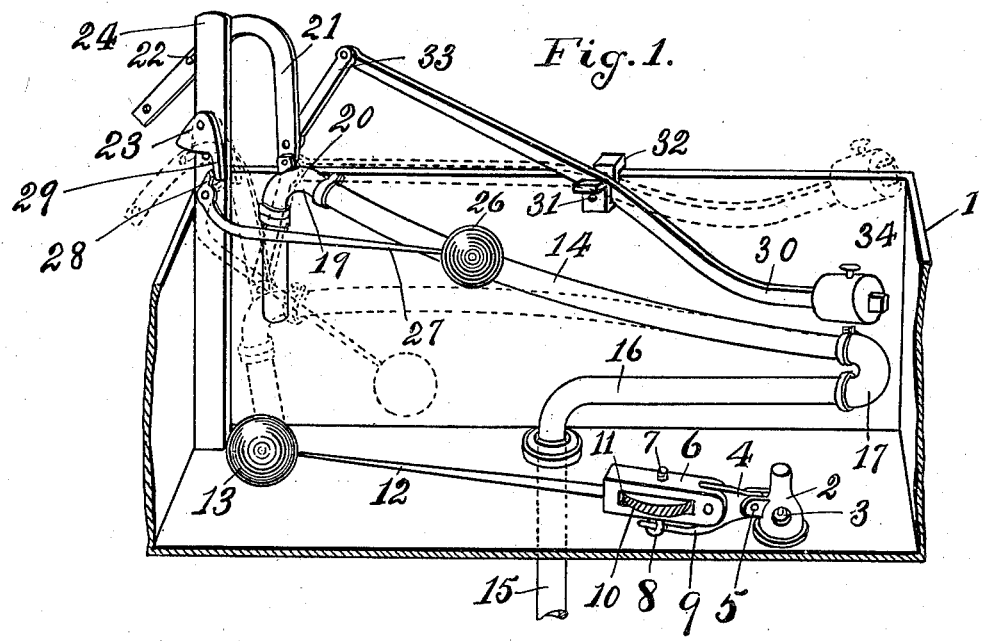
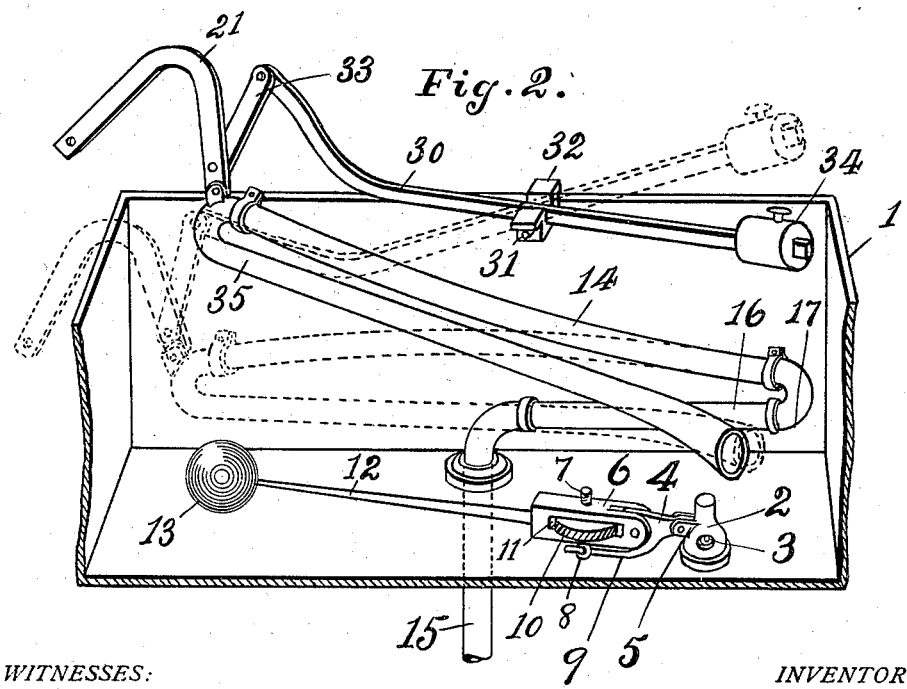
WITNESSES:
K. Lockwood Nevins,
Bessie Gorfinkel
INVENTOR.
Wm. A. Williams
BY
Francis M. Wright,
ATTORNEY.

No. 741,203. Patented October 13, 1903.

UNITED STATES PATENT OFFICE.

WILLIAM A. WILLIAMS, OF SAN FRANCISCO, CALIFORNIA.

FLUSHING-TANK.

SPECIFICATION forming part of Letters Patent No. 741,203, dated October 13, 1903.

Application filed February 14, 1903. Serial No. 143,407. (No model.)

*To all whom it may concern:*

Be it known that I, WILLIAM A. WILLIAMS, a citizen of the United States, residing at San Francisco, in the county of San Francisco and State of California, have invented certain new and useful Improvements in Flushing-Tanks, of which the following is a specification.

My invention relates to improvements in flushing-tanks, the object of my invention being to provide an apparatus of this character which shall be simple and economical in construction, not liable to get out of order, easily set up, easily adjusted, and as nearly noiseless as possible.

My invention therefore resides in the novel construction, combination, and arrangement of parts for the above ends hereinafter fully specified, and particularly pointed out in the claims.

In the accompanying drawings, Figure 1 is a perspective view of the tank with the front side broken away to show the construction. Fig. 2 is a similar view of a modification.

Referring to the drawings, 1 represents the tank, and 2 the supply-valve therefor, which is of the ordinary construction, having a plunger 3 and a lever 4 pivoted on the valve-casing, as shown at 5, and engaging the plunger. On the outer end of said lever is pivotally mounted a shank 6, through which passes an adjusting-screw 7, the head of which is formed into an eye 8. Said eye is passed over a finger or extension 9 of the lever and prevents said screw from turning. Upon said screw is mounted an adjusting ring or nut 10, which is contained in a central cavity 11 of the shank, so that the angular movement of the shank relatively to the lever is controlled by the movement of said ring or nut upon the screw. By screwing the ring up or down the shank may be correspondingly raised or lowered relatively to the lever. To said shank is secured the rod 12, carrying at its outer end the float 13. It will readily be seen that the height to which it is desired to permit the level of the water to rise before closing the valve may be readily adjusted by reaching down with the hand into the tank and turning the nut one way or the other with the finger.

An important feature of my invention consists in the construction of the siphon. Heretofore the general method of discharging the siphon has been to open a valve, which allows the water to flow out of the siphon. These valves are apt to leak, thus starting defects. Therefore my first object is to provide a construction in which no valve is used. This I do by depressing the siphon itself to commence the siphoning of the tank. Further, in depressing said siphon I aim to avoid the use of any movable joint which is expensive and apt to leak. For this purpose I provide as a part of the siphon a rubber tube 14. Such rubber tube, however, has to be made of considerable thickness in order to permit of bending without undue deformation of the tube at a single point, which would by constant use cause the tube to crack at that point. The tube being thick again necessitates that it shall be of considerable length, for a heavy thick tube cannot be bent sufficiently if of short length; but the length of the tank is limited, and, furthermore, the tank must be so constructed that the lever may be pulled from either end and the discharge-pipe be in the center, so as to allow of its setting up in various locations. To accomplish the above object, therefore, I provide the following construction: The discharge-pipe 15 discharges from a point equidistant from the ends of the tank, and to said discharge-pipe is connected a pipe 16, preferably of metal, leading to one end of the tank, as shown, and there bent upward, as shown at 17. Upon the end of said upwardly-bent portion is clamped the end of a thick rubber tube 14, the other end of which is clamped to a metal pipe 19, bent downward, as shown at 20. To said latter pipe is connected a bar 21, which is bent over in the form of a hook, as shown, to the end of which can be attached the usual chain for siphoning the tank. When the bar is so depressed, the bend 20 in the pipe 19 is forced below the water-line, and the siphoning action is started through the rubber tube 14 and the pipe 16. A stud 22 projects from the side of the bar 21, and as the bar is depressed said stud engages the side of a latch 23, pivoted upon a standard 24, and swings said latch inward, so that said stud can pass to the under side thereof, whereupon the latch again immediately swings outward by its own weight and engages said stud and holds the siphon down. The siphon is thus held down until the level of the water has fallen to a point where the air begins to enter the bottom of the siphon. It is desirable to release the siphon immediately when this happens, so as to prevent the snorting and gurgling noise caused by the passage of air underneath the lip of the siphon. To permit this to be done automatically, I provide a float 26, which swings on the end of a lever 27, pivoted upon the standard 24, an arm 28 of which lever engages a tongue 29 upon the latch. Said float 26 descends with the level of the water, and when it has reached a level at which the air would begin to enter the bottom of the siphon the arm will have moved inwardly sufficiently to release the stud 22 from the latch and permit the bar and siphon to rise. This they will immediately do by reason of the counterbalance-weight 34 upon the end of a lever 30, pivoted at 31 upon a bracket 32, secured upon the side of the tank, the forward end of said lever being connected with said bar by means of a link 33.

In Fig. 2 I have shown a modification in which the latch is dispensed with, the upper end of the rubber tube being connected in this case with a pipe 35, which is bent backward in a direction substantially parallel with said rubber tube. The mouth of this latter pipe forms the mouth of the siphon and remains comparatively near the bottom of the tank whether the siphon be raised or lowered. As soon as the siphon has been depressed and the chain released the siphon will rise to its original position; but the siphoning will continue until the water reaches the level of the mouth of the siphon, and as soon as any air enters said mouth, by reason of the gradual slope of said pipe 35, the air will easily run up said pipe close to the upper side thereof and will break the siphoning action without any snorting noise.

The flexible joint connecting the siphon with the discharge-pipe, especially the joint of rubber hose, the continuous walled siphon, and the float acting independently of the siphon form the subjects of claims of a copending application filed by me, Serial No. 130,076, and I do not claim the same herein.

I claim—

1. The combination, with a tank, of a discharge-pipe therefor located at a point equidistant from the ends of the tank, a pipe connected with said discharge-pipe and leading to a point close to one end of the tank and there bent round, a flexible rubber tube connected with said bent end and extending substantially the whole length of the tank, a downwardly-extending pipe connected with the free end of said rubber tube, and means for depressing the siphon by bending said rubber tube, substantially as described.

2. The combination, with a tank, of a discharge-pipe therefor located at a point equidistant from the ends of the tank, a pipe connected with said discharge-pipe and leading to a point close to one end of the tank and there bent round, a flexible rubber tube connected with said bent end extending substantially the whole length of the tank, a downwardly-extending pipe connected with the free end of said rubber tube, and means for depressing the siphon by bending said rubber tube, a latch for automatically retaining said siphon when so depressed and a float for withdrawing said latch to release said siphon, said latch operating to retain the siphon independently of said float, substantially as described.

3. The combination of the plunger, the pivoted lever for operating the plunger, the shank pivotally mounted upon the outer end of said lever and having a transverse cavity, the adjusting-screw passing through said shank having an eye passed over a finger or extension of the lever, the adjusting ring or nut in said cavity on said screw, the rod secured in the end of the shank, and the float on the end of the rod, substantially as described.

In witness whereof I have hereunto set my hand in the presence of two subscribing witnesses.

W. A. WILLIAMS.

Witnesses:
FRANCIS M. WRIGHT,
BESSIE GORFINKEL.